(12) United States Patent
Martin

(10) Patent No.: US 6,259,959 B1
(45) Date of Patent: Jul. 10, 2001

(54) METHOD FOR DETERMINING THE PERFORMANCE COMPONENTS OF A MANUFACTURING LINE

(75) Inventor: Donald P. Martin, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/148,826

(22) Filed: Sep. 4, 1998

(51) Int. Cl.$^7$ ..................................................... G06F 19/00
(52) U.S. Cl. .................................................................. 700/99
(58) Field of Search ..................................... 700/173, 108, 700/109, 101, 111, 102, 100, 99; 705/8

(56) References Cited

U.S. PATENT DOCUMENTS

| | | | |
|---|---|---|---|
| 5,177,688 | * | 1/1993 | Rentschler et al. ................. 700/101 |
| 5,229,948 | * | 7/1993 | Wei et al. ............................. 700/99 |
| 5,446,671 | * | 8/1995 | Weaver et al. ....................... 700/100 |
| 5,546,329 | * | 8/1996 | Kurtzberg et al. ................... 702/83 |
| 5,748,478 | * | 5/1998 | Pan et al. ............................. 700/99 |
| 5,880,960 | * | 3/1999 | Lin et al. ............................. 700/99 |
| 6,104,965 | * | 8/2000 | Lim et al. ............................ 700/112 |

OTHER PUBLICATIONS

Shea et al. "Development and Implementation the Range Management System in a Multi–Flow Fabricator", IEEE/SEMI, 1997.

Labanowski, L. "Improving Overall Fabricatior Performance Using the Continuous Improvement Methodology", IEEE/SEMI, 1997.

Aurand et al. "The Operating Curve: A Method to Measure and Benchmark Manufacturing Line Productivity", IEEE/SEMI, 1997.

IEEE Catalog No. 97CH36089, "8th Annual IEEE/SEMI", p. i–iii, Sep. 1997.

* cited by examiner

Primary Examiner—William Grant
Assistant Examiner—Edward F. Gain
(74) Attorney, Agent, or Firm—McGinn & Gibb, PLLC; Richard M. Kotulak, Esq.

(57) ABSTRACT

A process for optimizing a manufacturing line comprises determining work center raw processing times of a plurality of work centers in the manufacturing line, summing the work center raw processing times to produce a manufacturing line raw processing time, determining work center cycle times of the work centers, dividing the work center cycle times by respective ones of the work center raw processing times to produce work center X-factors, weighting each of the work center X-factors by a percentage that a corresponding one of the work center raw processing times represents of the manufacturing line raw processing time to produce X-factor contributions for each of the work centers and modifying at least one work center of the work centers having an X-factor contribution higher than others of the X-factor contributions to reduce the X-factor contribution of the at least one work center.

21 Claims, 8 Drawing Sheets

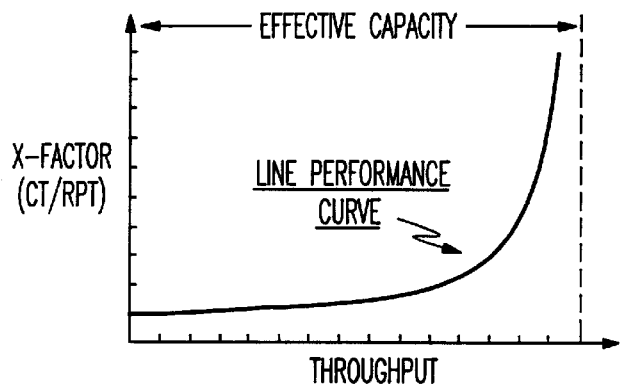
FIG.1
FIG.2B
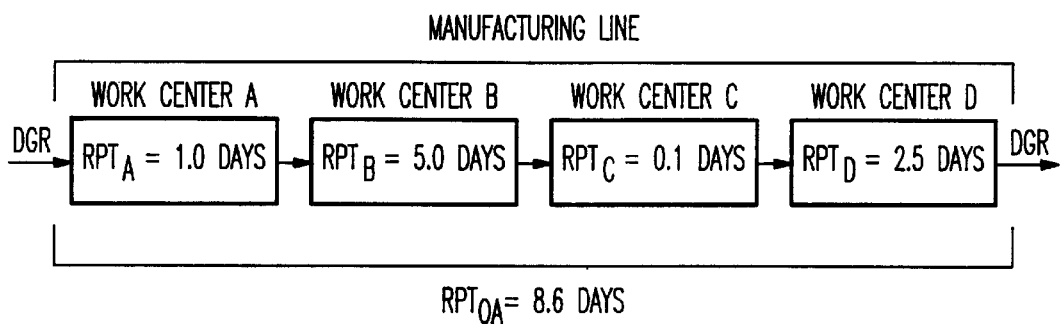
FIG.2A
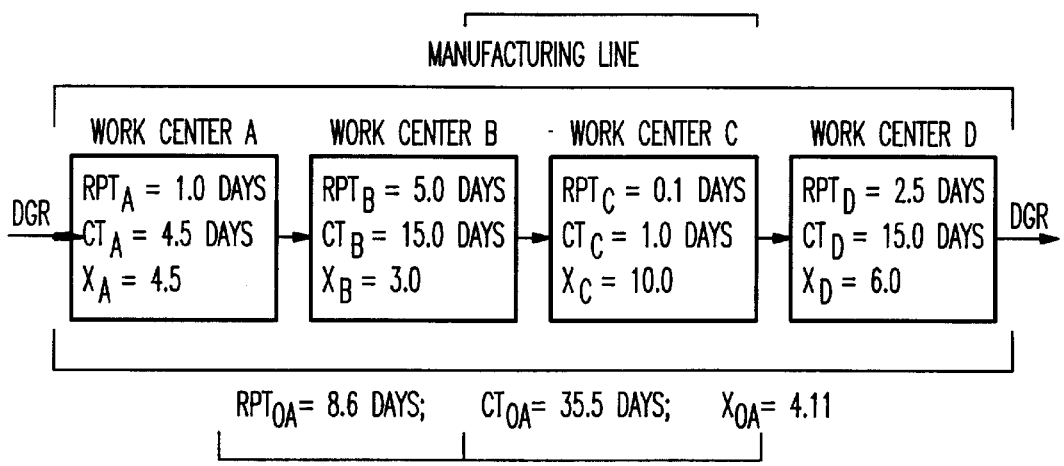
FIG.2C

|  | RPT | X | XFC |
|---|---|---|---|
| WORK CENTER A | 1.0 | 4.5 | 0.52 |
| WORK CENTER B | 5.0 | 3.0 | 1.74 |
| WORK CENTER C | 0.1 | 10.0 | 0.11 |
| WORK CENTER D | 2.5 | 6.0 | 1.74 |
|  | $X_{OA}$ | | 4.11 |

|  | RPT | X | XFC |
|---|---|---|---|
| TOOL 1 | 1.0 | 2.0 | 0.40 |
| TOOL 2 | 3.5 | 3.14 | 2.20 |
| TOOL 3 | 0.5 | 4.0 | 0.40 |
|  | $X_B$ | | 3.0 |

METHOD FOR DETERMINING THE PERFORMANCE COMPONENTS OF A MANUFACTURING LINE

BACKGROUND OF THE INVENTION

1. Field of the Invention

The invention is directed to determining which tools or toolset have the greatest impact on manufacturing line performance and more particularly to a method for determining the performance components of a manufacturing line.

2. Description of the Related Art

Over the past two decades continuous flow manufacturing (CFM) has been the principle operational tool to help manage and improve the utilization of manufacturing assets. As the name connotes, the key focus of CFM is to measure and manage the throughput of tools/toolsets that comprise the manufacturing line. To this end, there have been a variety of systems proposed to help manage throughput with their attendant control methodologies.

Semiconductor manufacturing is faced with significant investment and cost challenges. The investment required to build and tool a semiconductor manufacturing line has steadily increased so that now in excess of $1 Billion is needed. In addition, the industry has been characterized by products (e.g., dynamic random access memories "DRAMS") that have sustained long term price declines of some 27% per year over the past 20 years. A significant component of maintaining this price decline has been the ability of manufacturing/engineering to reduce costs by increasing productivity, not only in terms of good chips per wafer, which are driven by technology and yields, but by identifying and improving the utilization of the installed tool base.

One of the principle methods used to improve asset utilization in manufacturing has been continuous flow manufacturing (CFM) which includes a number of techniques that focus primarily on the flow of product through the line as the means to identify and fix problems in the line. One such example is the Theory of Constraints, which determines the toolset(s) which limit the throughput of the line and then provides a set of operational roles (Drum-Buffer-Rope) that seek to maximize the use of the constraining toolset(s). Another example, that was developed by the Japanese as part of their lean manufacturing, is the use of KANBANS, which are devices for limiting the movement of product between toolsets. The result is a limit on the amount of work in progress (WIP) in front of each toolset. Ideally, a KANBAN ensures that there is neither to much nor too little WIP; too much WIP results in line congestion while too little WIP allows a toolset to run out of work.

In the past few years there has been an increased awareness in semiconductor manufacturing that there is a relationship between the utilization of effective capacity and cycle time and the invention presents a new methodology to analyze this relationship and produce unexpected benefits when compared to conventional methods and structures.

SUMMARY OF THE INVENTION

It is, therefore, an object of the present invention to provide a structure and method for exploring how the X-factor (normalized cycle time), rather than throughput, is used as the prime production line control and production line parameter; hence, the invention is sometimes referred to herein as short cycle time manufacturing (SCM.).

More specifically, the invention includes a process, computer system and computer storage medium for optimizing a manufacturing line comprising, determining work center raw processing times of a plurality of work centers in the manufacturing line, summing the work center raw processing times to produce a manufacturing line raw processing time, determining work center cycle times of the work centers, dividing the work center cycle times by respective ones of the work center raw processing times to produce work center X-factors, weighting each of the work center X-factors by a percentage that a corresponding one of the work center raw processing times represents of the manufacturing line raw processing time to produce X-factor contributions for each of the work centers, and modifying at least one work center of the work centers having an X-factor contribution higher than others of the X-factor contributions to reduce the X-factor contribution of the at least one work center.

The step of determining work center raw processing times comprises measuring a time for a work center to perform work on a workpiece, and the step of determining work center cycle times comprises measuring a time from when the workpiece arrives at the work center until the workpiece leaves the work center. The step of modifying at least one work center further comprises determining whether the at least one work center is being utilized at approximately a maximum effective capacity. The step of modifying at least one work center comprises increasing effective capacity of the at least one work center. The step of modifying at least one work center comprises optimizing batch-size for at least one work center.

The work center comprises a group of tools and the determining work center raw processing times, summing the work center raw processing times, determining work center cycle times, dividing the work center cycle times by respective ones of the work center raw processing times, weighting each of the work center X-factors and modifying at least one work center are repeated for each tool within the work center to determine which tool of the tools has an X-factor contribution higher than others of X-factor contributions of the tools.

Because manufacturing lines have both throughput and X-factor commitments, the invention utilizes the fundamental relationships between throughput, capacity and X-factor. The X-factor is a much more sensitive indicator of capacity problems than throughput because X-factor increases rapidly as the throughput approaches the effective capacity, as shown in FIG. 1, discussed below. This sensitivity in X-factor is used by the invention as a powerful diagnostic tool to uncover unanticipated capacity issues.

Short cycle time manufacturing (SCM) allows each tool/toolset to be analyzed depending on its demonstrated X-factor and capacity versus a target to determine which tools/toolsets need improvement, since the overall X-factor of the line is just the weighted sums of the component toolset X-factors. In addition, the impact of mix and volume with a cycle time constrain the capacity of tools that are affected by batch or train size. Thus, SCM provides significant advantages over CFM in helping to manage and improve manufacturing asset utilization.

The present invention utilizes the X-factor as an important measurement and diagnostic parameter for semiconductor manufacturing lines and the X-factor forms the basis for short cycle-time manufacturing (SCM). The throughput constraint is not necessarily the performance constraint for the line. As a result, modifications to the production line that are driven primarily by continuous flow manufacturing can result in no improvement in line performance.

The invention relates the X-factor performance of each tool in the line to the overall line X-factor, which allows for the generation of customized performance targets per tool that still fulfill the overall line objective and prioritizes the tools so that the biggest contributors to line performance can be identified and improved.

In addition, the impact of the volume per recipe with an X-factor constraint is taken into consideration by the invention. This enables more accurate planning parameters and improved operational procedures. As a result, better decisions can be made with the invention concerning the application of scarce resources to increase capacity, whether by purchasing more equipment, applying more operators to run existing equipment, changing process characteristics, or by improving the lot selection capability.

BRIEF DESCRIPTION OF THE DRAWINGS

The foregoing and other objects, aspects and advantages will be better understood from the following detailed description of a preferred embodiment of the invention reference to the wings, in which:

FIG. 1 is a chart illustrating a production line performance curve;

FIGS. 2A and 2C are schematic drawings of hypothetical manufacturing lines;

FIG. 2B is a table describing the utilization of effective capacity for each work station;

DETAILED DESCRIPTION OF A PREFERRED EMBODIMENT OF THE INVENTION

Figures 3A, 3B, 4:
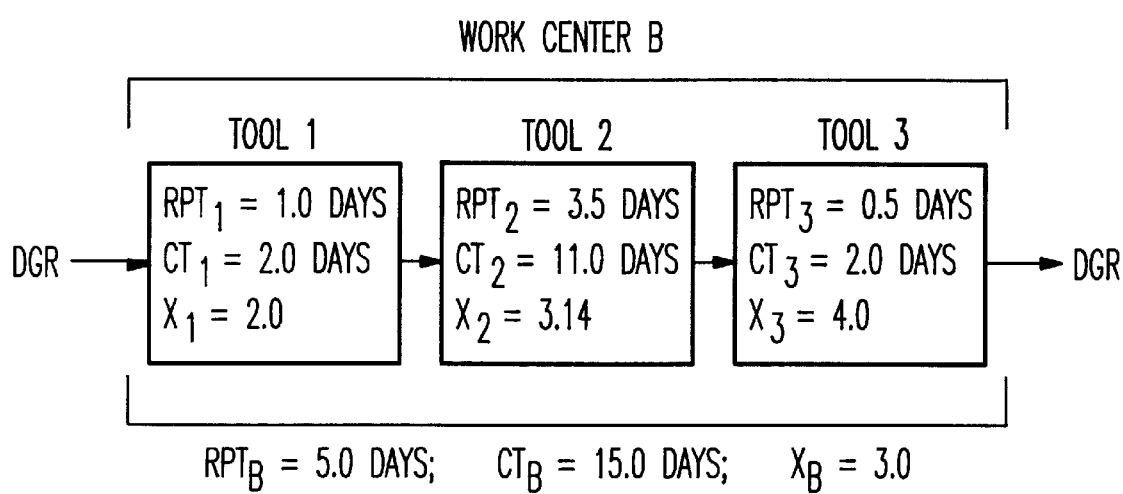
FIGS. 3A–3B are tables illustrating X-factor contributions of different work centers and tools.
FIG. 4 is a schematic drawings of a hypothetical manufacturing line.

In semiconductor manufacturing an increase in utilization of effective capacity results in longer cycle times. For example, FIG. 1 illustrates a production line performance curve where an X-factor (normalized cycle time) is shown on the y-axis and throughput is shown on the x-axis. The X-factor is generally referred to as cycle time divided by raw process time where the cycle time is the time necessary for a workpiece to wait for the tool and be processed by the tool and raw processing time is only the time necessary for the tool to actually work on the workpiece. The "effective capacity" in FIG. 1 represents the maximum throughput available for a given production line.

A relationship exists between tool utilization and the normalized cycle time (X-factor) of the product moving through these tools. For example, an equation to describe this interrelationship can be expressed as $$X = \frac{1 - UTIL/2}{1 - UTIL} \quad (1)$$

where UTIL represents the utilization of the effective capacity of a given tool or toolset. Equation 1 describes the shape of the performance curve illustrated in FIG. 1.

More specifically, as throughput is increased toward effective capacity, cycle time must necessarily increase. As shown in FIG. 1, a nonlinear relationship exists between throughput and cycle time. As a result, relatively small changes in throughput can cause significantly larger changes in cycle time.

The cycle time of products in the line has a significant impact on productivity learning and customer serviceability. Therefore, there is a tradeoff between the cost of the reduced throughput required to achieve a given cycle time and the value of increased productivity achieved by this cycle time.

Consequently, measuring and managing cycle time, or the X-factor, is of paramount importance and provides a significantly more sensitive indicator to capacity problems than does just managing throughput.

FIG. 2A, illustrates a manufacturing line having the same daily going rate (DGR) through four work centers. Each center has a distinct raw process time (RPT), which is the minimum time (i.e., no queue time) to process a unit of production through each work center. The total raw process time through the line is the sum of the raw process times of the work centers ($RPT_{OA}$) and totals 8.6 days.

The capacity of each work center is a combination of several factors, including the number of tools, the average tool availability, the raw process time, etc. For the sake of this application it is assumed that for a given DGR the effective capacity of each work center is used as shown in FIG. 2B.

More specifically, FIG. 2C illustrates raw processing time ($RPT_N$), the cycle time ($CT_N$) and the X factor (cycle time/raw processing time) ($X_N$) for each work center. In addition, FIG. 2C illustrates the overall raw processing time ($RPT_{OA}$), cycle time ($CT_{OA}$) and X factor ($X_{OA}$). The processing line has an average cycle time of 35.5 days and a total raw process time of 8.6 days, which results in an average X-factor of 4.11.

As shown in FIG. 2B, work center C is the throughput bottleneck (e.g., has the highest utilization of effective capacity) for the line and its capacity will, therefore, be the first constraint for throughput. As a result, in the absence of any cycle time metrics, most of the line activities driven by CFM principles will focus improvement activities around work center C. In fact, the Theory of Constraints would suggest that in order to maximize the utilization of the constraining capacity, significant WIP should be positioned in front of this work center.

To relate overall line performance to the performance of each work center, the total cycle time is divided by the total raw process time. This is expressed as $$X_{OA} = \frac{CT_{OA}}{RPT_{OA}} = \frac{CT_A + CT_B + CT_C + CT_D}{RPT_A + RPT_B + RPT_C + RPT_D} \quad (2)$$

By defining $X_i$ and $f_i$ as $$f_i = \frac{RPT_i}{RPT_{OA}} = \frac{RPT_i}{RPT_A + RPT_B + RPT_C + RPT_D} \quad (3)$$

$$X_i = \frac{CT_i}{RPT_i} \quad i = A, B, C, D \quad (4)$$

Equation 2 can then be rewritten as $$X_{OA} = f_A * X_A + f_B * X_B + f_C * X_C + f_D * X_D \quad (5)$$

Equation (5) expresses the overall line X-factor in terms of the components of the work centers. Specifically, the contribution of each work center's X-factor to the overall line X-factor is weighted by the fraction of the raw process time spent in that work center. Therefore, this analysis is called X-factor contribution (XFC).

The work center contributions for the manufacturing line shown in FIG. 2C are listed in FIG. 3A. More specifically, FIG. 3A illustrates the weighting of the X-factor (X) by raw processing times (RPT for each of the work centers, to arrive at X-factor contributions (XFC). Therefore, FIG. 3A illustrates an apportionment of the overall X-factor ($X_{OA}$) between the different work centers.

Even though work center C is the throughput bottleneck to the line, the cycle time performance of that line is dominated by work centers B and D. This is an example of where the throughput constraint of the line does not necessarily determine the performance characteristics of the line. Focusing on the throughput constraint (i.e., work center C) will have a very small affect on line performance. For instance, even if the capacity of work center C is increased so that all product could run at 1X (i.e., no queues), for the same DGR, the overall line X-factor would only drop from 4.11 to 4.01.

Assume that work center B is, in turn, composed of three tools with the characteristics shown in FIG. 4. Following the same logic used to derive equations (2) and (3), it can be shown that $$X_B + f_1 * X_1 + f_2 * X_2 f_3 * X_3 \quad (6)$$

so that the X-factor contribution looks like FIG. 3B, which shows that the performance characteristics of work center B are dominated by the performance of tool 2. As with FIG. 3A, FIG. 3B illustrates the weighting of the X-factor (X) by raw processing times (RPT) for each of the tools within a given work center, to arrive at X-factor contributions (XFC).

The performance of each work center and the performance of each tool can be tied to overall line performance. Overall line performance can be expressed as the sum of the N individual tool performances $$X_{OA} = \sum XFC_i \quad i = 1, 2, \ldots N \quad (7)$$

where $$XFC_i = \frac{RPT_i}{RPT_{OA}} * X_i \quad i = 1, 2, \ldots N \quad (8)$$

In the example developed above, tool 2 in work center B contributes an X-factor of 1.28 of the overall line X-factor of 4.11; that is, with the invention, it can be determined that tool 2's performance determines 31% of the overall line performance.

Tools with raw process times of less than a half hour tend to have significantly higher X-factors than tools with raw process times greater than a half hour because shorter raw process time tools are effected, for example, by transportation and staffing issues more than the longer raw process time tools. For a six-hour furnace operation, the effects of lunch/break are insignificant on the X-factor; as opposed to a 20-minute ion implant, where lunch/break can significantly impact the X-factor. Therefore, the customization of X-factor targets by individual tools/toolsets, while still maintaining the overall line X-factor objective, is of crucial importance.

Since the raw process times by tool in the short term tend to be constant, equations (7) and (8) can be used to set individual toolset targets. The X-factors for each tool can be set to a different value subject to the requirement that the summation of the target X-factor contributions must equal the overall X-factor objective for the line.

Figure 5:
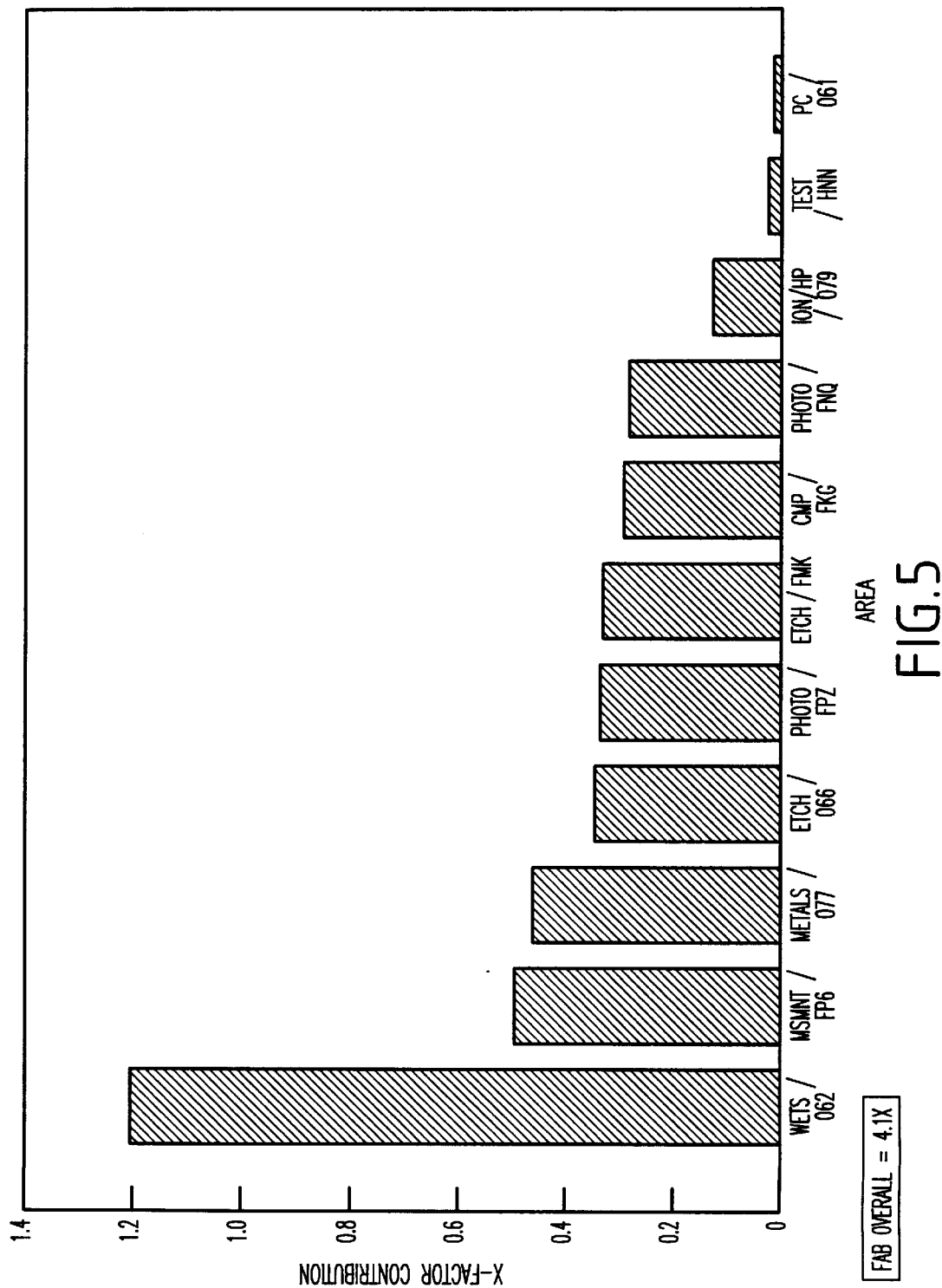
FIG. 5 is a bar graph illustrating different X-factors by area.
Figure 6:
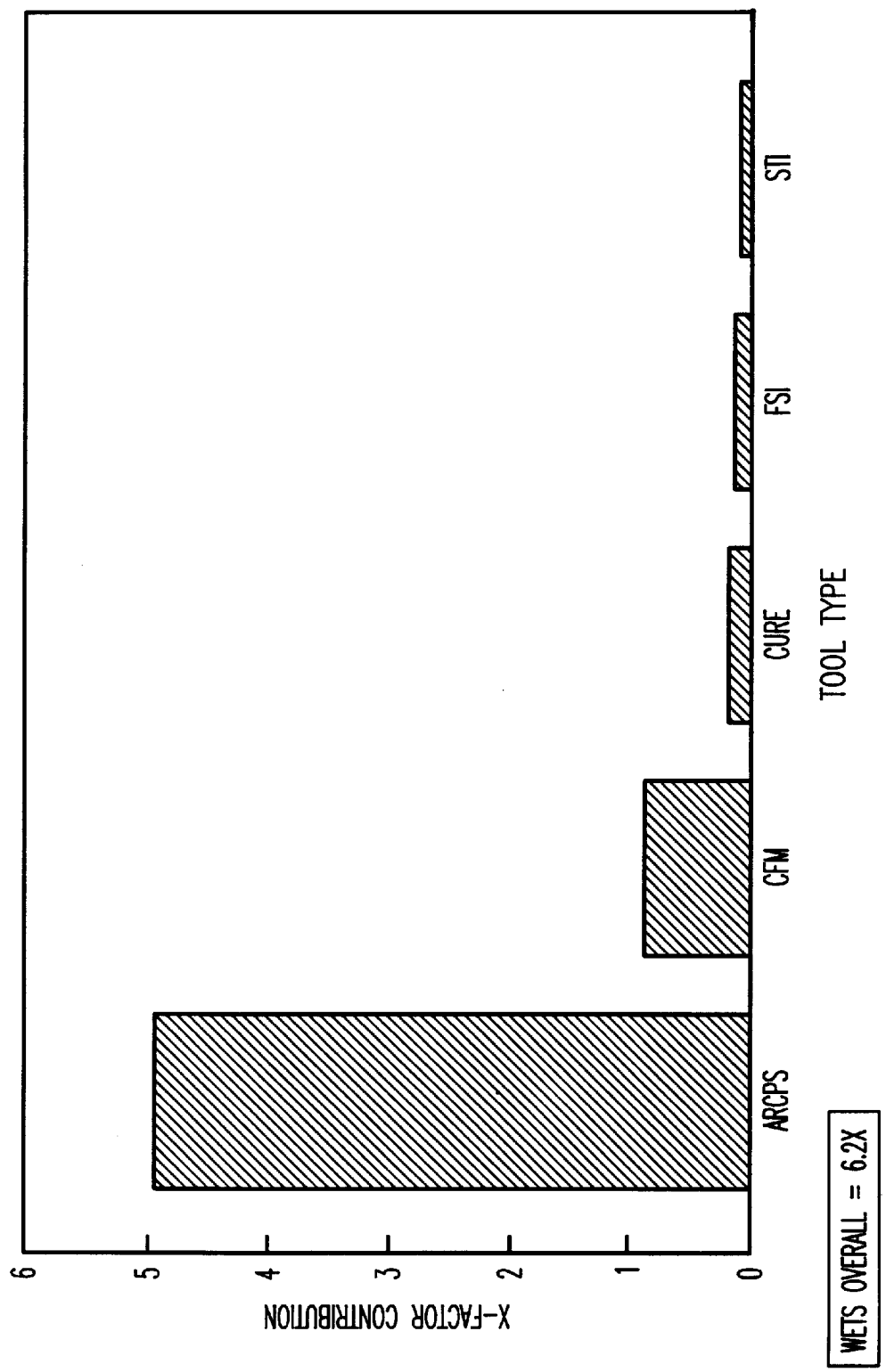
FIG. 6 is a bar graph illustrating X-factor contributions for a specific area.
Figure 7:
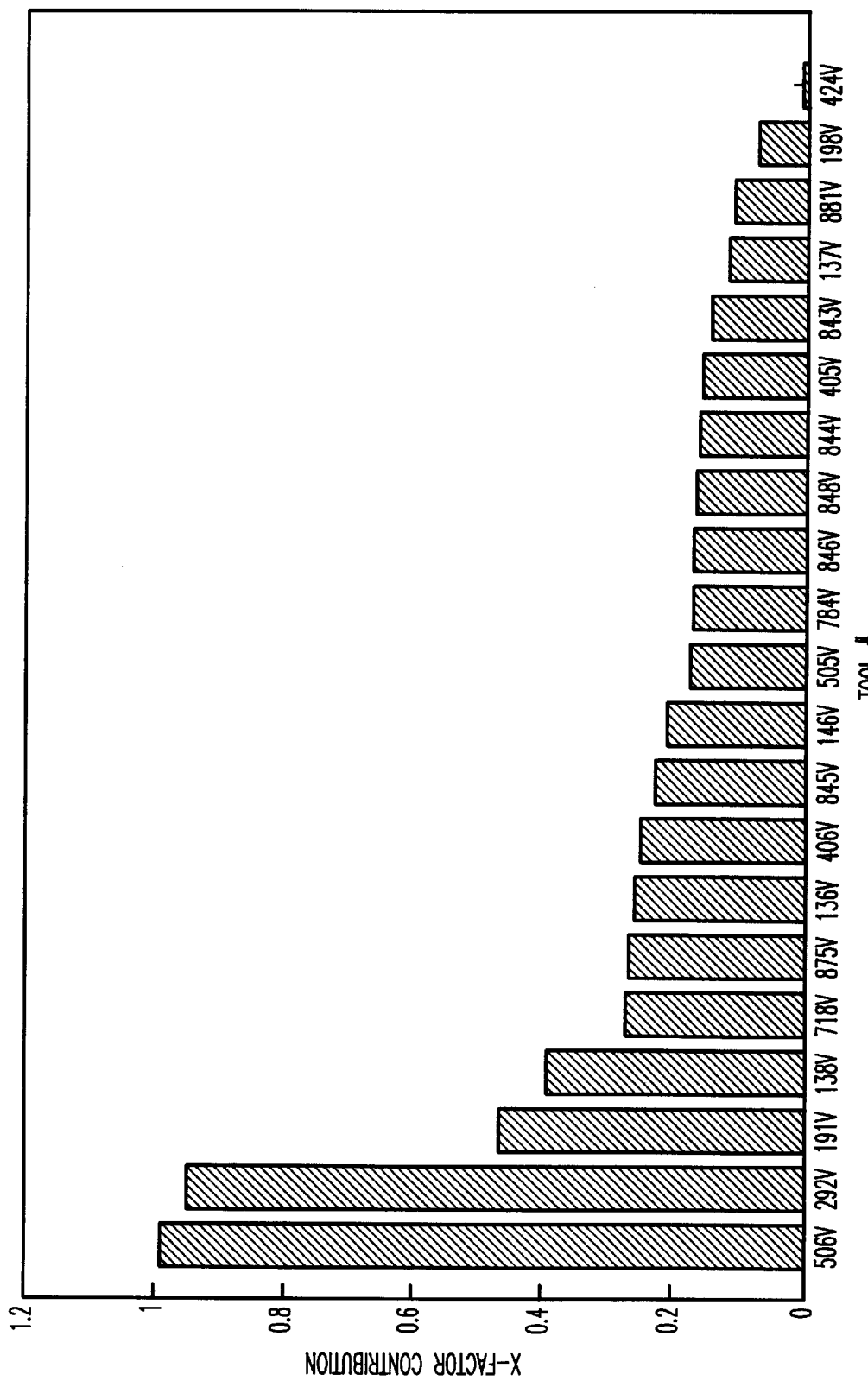
FIG. 7 is a bar graph illustrating X-factor contribution of a specific tool set.

The use of the X-factor contribution analysis for a semiconductor manufacturing line is shown in FIGS. 5, 6, and 7. FIG. 5 shows the line aggregated into 12 major departments, which include all tools being run by each department. In this case, it is clear that the department called WETS has the largest X-factor contribution for the entire line. FIG. 6 shows that of all the tool types being run by this department, ARCPS tools have the greatest X-factor contribution. Finally, FIG. 7 shows that within all the ARCPS tools, the four tools dominate the performance of the tool set.

If the capacity utilization of these four ARCPS tools is reduced so that their X-factor contribution within the ARCPS toolset decreases to 0.2, then the X-factor for the ARCPs toolset decreases from 5.7 to 3.7. As a result, the X-factor for all the WETs tools decreases form 6.2 to 4.5. Finally, this reduction in WETS X-factor will result in the overall line X-factor decreasing form 4.1 to 3.8. That is, improving the performance of four selected tools by a given amount will result in a quantifiable improvement in the performance of the overall line.

This is an example of the power of the invention. A line performance issue can be quickly tracked to the offending tool(s), improvement activities can be focused on these specific tools, and, finally, the impact of these actions can be related back to the resulting change in overall line performance.

Returning to the hypothetical line represented in FIG. 2B, it is clear that work centers B and D dominate the performance of the line because together they contribute a total of 3.48 of the 4.11 X-factor. With the invention it can be determined which of these two work centers should be improved to lower the overall line X-factor.

More specifically, referring to FIG. 2B, work center B has a lower utilization of its capacity than does work center D. The inference here is that it is probably better to first focus on increasing the capacity of work center D is on the steeper part of the performance curve. So, for example, by increasing the capacity of work center D by 10%, the utilization of capacity decreases from 91% to 82%. As a result, the X-factor for work center D decreases from 6.0 to 3.3, which, in turn, decreases the overall line X-factor from 4.11 to 3.32.

Alternatively, increasing the capacity of work center B by 10% decreases the utilization of capacity from 80% to 72%, which only results in a decrease in X-factor from 3.0 to 2.3. This, in turn, causes a smaller decrease in the overall line X-factor from 4.11 to 3.71. This smaller impact on overall line performance for work center B occurs because it is on the flatter part of the performance curve, therefore, a 10% change in capacity does not produce as large a change in X-factor as for work center D.

At this point, the question of where to invest additional capacity becomes a business decision. That is, even though a 10% increase in capacity for work center D has a larger impact than a 10% increase in capacity for work center B, the investment required between the two work centers to accomplish this capacity increase must still be investigated. For example, if the tools in work center D are very expensive and the ones in work center B relatively inexpensive, it might make more sense to invest in increasing the capacity of work center B.

Another dimension of the invention deals with the effect of mix and volume on tool capacity when there is a cycle time expectation for product moving through tools that are batch-size or train-size sensitive.

The amount of the available run size that can be used depends on how many wafers a day for a given recipe arrive at the tool to be processed and how long lots can afford to wait before being processed. For example, if an average of 25 wafers a day arrive at a furnace with a 200-wafer batch capacity and a raw process time of four hours, then running with full loads will require that a run occur every eight days, which results in an average X-factor of 22. On the other hand, the furnace is run daily with only 25 wafers, the result is an X-factor of 1. However, such 25-wafer daily runs significantly underutilizes the available capacity of the 200-wafer batch capacity furnace.

Thus, the effective capacity of tools must be described in terms of both the volume per recipe and X-factor objectives in order not to create an unexpected bottleneck in the line. The variables used in calculating the average train size or batch size are defined as:

M=average number of lots per day per tool per recipe

N=average number of lots in a batch or train

RPT=average raw process time per lot

X=average X-factor for lob processed through the tool

For example, if the arrival of lots at a particular tool in a semiconductor manufacturing line is random; that is, the average time between lot arrivals (in hours) for a given recipe is given by 24/M, the average wait time to accumulate a train or batch size of N lots can be calculated by summing the wait time for each of the N lots and dividing by the number of lots N. Assuming that the run is started when the last lot arrives, then the last lot has zero wait time, the next to last lot waits on average 24/M hours, the lot previous waits 2×24/M hours, and so forth. Thus, the average wait time for N lots can be calculated by equation (9)

$$\text{Avg Wait} = \frac{0 + 1*24/M + 2*24/M + \ldots (N-1)*24/M}{N} \quad (9)$$

which can be written as $$\text{Avg Wait} = \frac{(24/M)*(1 + 2 + 3 + \ldots N - 1)}{N} \quad (10)$$

Using the identity $$\frac{N*(N-1)}{2} = (1 + 2 + 3 + \ldots N - 1) \quad (11)$$

and substituting into equation (10) shows that the average wait time can be expressed as $$\text{Avg Wait} = \frac{12}{M}*(N - 1) \quad (12)$$

By definition, the cycle time is raw process time plus average wait time. Since the X-factor is the cycle time divided by the raw process time, the following equation holds true:

$$X = 1 + \frac{AvgWait}{RPT} \quad (13)$$

Finally, substituting for the average wait from equation (12) and solving for the number of lots in a batch or train N gives:

$$N = 1 + \left((X - 1)*M*\frac{RPT}{12}\right) \quad (14)$$

Equation (14) now relates the average number of lots N to the arrival rate per recipe M and the allowable X-factor. For example, if an X-factor of 1 is required, then N=1, indicating that the only way this can happen is if each lot is run as soon as it arrives at the tool. Multiplying equation (14) by the average lot size produces the calculated average batch size or train size.

Using the 200-wafer batch capacity furnace example mentioned above, the average number of lots in a batch can be customized with the invention to accommodate any target X-factor. For example, if the X-factor of 22 mentioned above needs to be reduced to 10, the values would be substituted into the equation (14) as follows:

Batch size=25[1+((10−1)*1*(4/12))=100

Therefore, if the X-factor need to be reduced to 10, the batch size would equal 100 wafers and the furnace would be operated once every two days.

Figure 8:
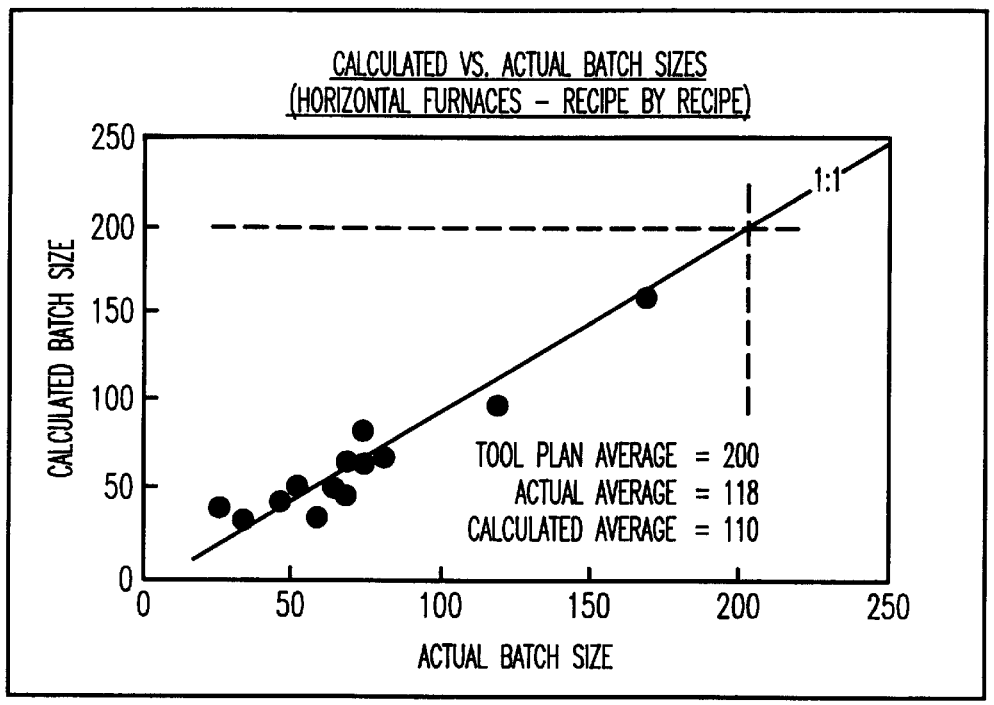
FIG. 8 is a graph illustrating actual verses calculated batch sizes for a horizontal furnace.

An additional advantage of the invention is seen in plotting the actual batch size versus the calculated batch size. This feature of the invention enables both operational and planning issues to be determined. For example, FIG. 8 shows a plot for what is nominally a 200-wafer batch furnace.

In this case, because of the low volumes per recipe being run through these tools, tool capacity is grossly underutilized. This is a classic example of where, operationally, there is little that can be done to increase batch sizes and, therefore, this capacity loss is directly attributable to the business decisions made and must be factored into the capacity planning process. In fact, an argument may be made that perhaps a different kind of tool with a smaller batch size would be more cost effective.

Figure 9:
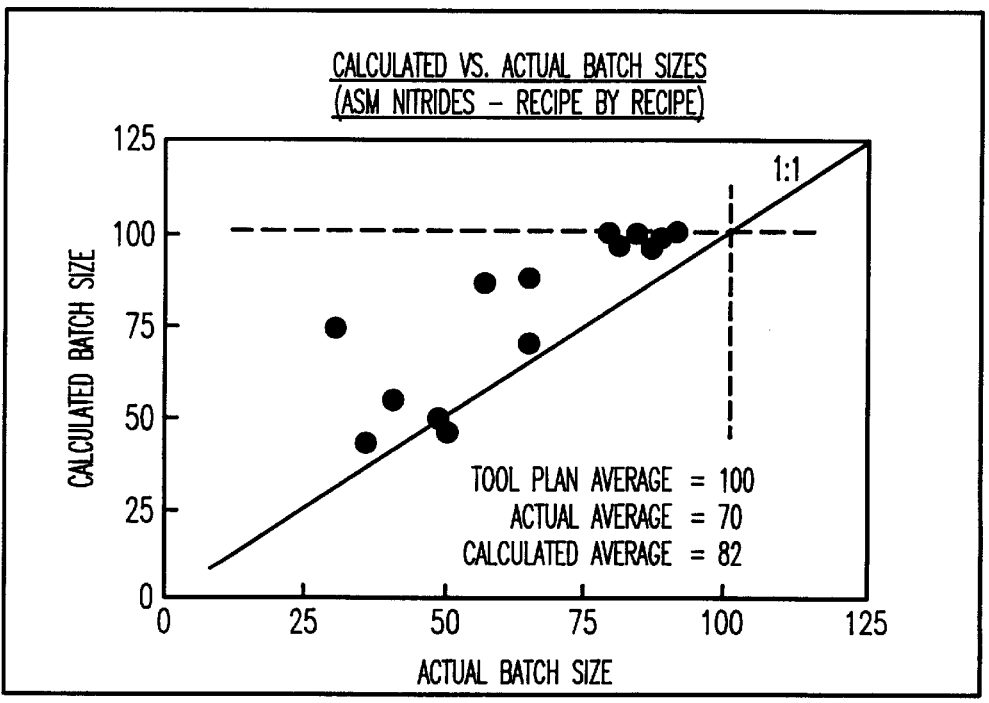
FIG. 9 is a graph illustrating actual verses calculated batch sizes of nitride deposition tools.

A second example for a set of nitride deposition tools having 100-wafer batches is shown in FIG. 9. Here, two factors are clearly distinguishable. One is where the volumes per recipe will not allow (on average) the full utilization of the available capacity based on 100-wafer batches. Thus, the Tool Plan average is 100 wafers per batch, but the calculated average is 82 wafers per batch. The difference between planned and average utilization of 18 wafers per batch is a direct consequence of the mix and volume and the X-factor. Within these consmints, no decision can be made on the floor to get the batch sizes higher and the capacity planning system needs to reflect the smaller average batch size.

The other factor is that most of the points lie above the 1:1 reference line, which results in the calculated average of 82 wafers per batch and an actual average of 70 wafers per batch. The difference of 12 wafers per batch between actual and calculated indicates that there is an operational issue with how lots are selected for loading onto the tool. Specifically, there is a group of recipes with sufficient volume so that batch sizes should have been 100 wafers. Actual batch sizes, however, were between 75–90 wafers. This may indicate such problems such as logistics software on the manufacturing floor not displaying the optimum grouping of lots for processing for all the work in progress, and, therefore, operators not being given the appropriate tools to assist them in maximizing batch sizes.

Figure 10:
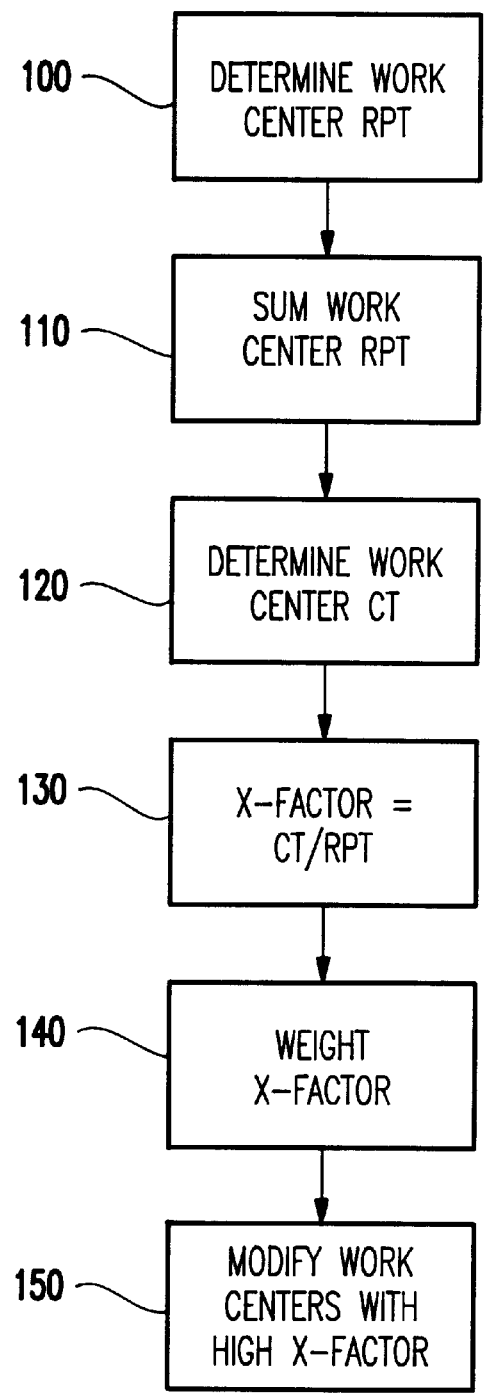
FIG. 10 is a flow chart of a preferred embodiment of the invention.
Figure 11:
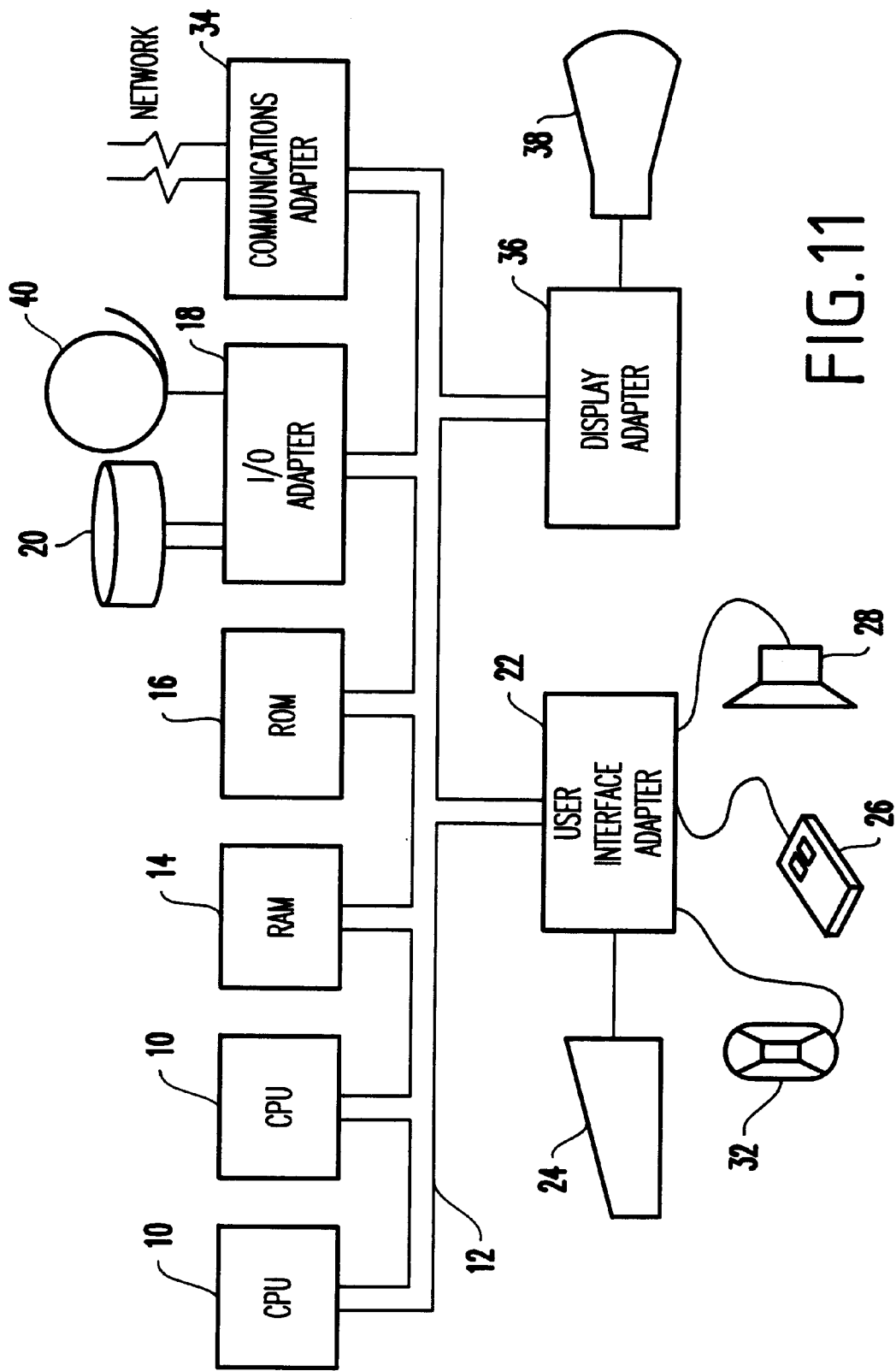
FIG. 11 is a schematic illustration of a computer system used with the invention.

The method of the invention is summarized in FIG. 10. More specifically, FIG. 10 illustrates a process for optimizing a manufacturing line comprising determining work center raw processing times of a plurality of work centers in the manufacturing line 100, summing the work center raw processing times to produce a manufacturing line raw processing time 110, determining work center cycle times of the work centers 120, dividing the work center cycle times by respective ones of the work center raw processing times to produce work center X-factors 130, weighting each of the work center X-factors by a percentage that a corresponding one of the work center raw processing times represents of the manufacturing line raw processing time to produce X-factor contributions for each of the work centers 140 and modifying at least one work center of the work centers having an X-factor contribution higher than others of the X-factor contributions to reduce the X-factor contribution of the at least one work center 150.

While the invention has been described with respect to an exemplary wafer processing environment, and has been described in the form of a manual process, it is equally applicable to all processing environments and all types of production lines. For example, the invention is equally applicable in a traditional mechanical factory setting or a non-traditional production process. Further, the invention includes a computer system, a computer program and a storage medium containing the computer program for performing the above-described process.

A representative hardware environment for practicing the present invention is depicted in FIG. 1, which illustrates the typical hardware configuration of an information handling/computer system in accordance with the subject invention having at least one processor or central processing unit (CPU) 10. CPUs 10 are interconnected via system bus 12 to a random access memory (RAM) 14, read-only memory (ROM) 16, an input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as touch screen device (not shown) to bus 12, communication adapter 34 for connecting the information handling system to a data processing network, and display adapter 36 for connecting bus 12 to display device 38.

While the invention has been described in terms of preferred embodiments, those skilled in the art will recognize that the invention can be practiced with modification within the spirit and scope of the appended claims.

What is claimed is:

1. A process for optimizing a manufacturing line comprising:
    determining work center raw processing times of a plurality of work centers in said manufacturing line;
    summing said work center raw processing times to produce a manufacturing line raw processing time;
    determining work center cycle times of said work centers;
    dividing said work center cycle times by respective ones of said work center raw processing times to produce work center X-factors;
    weighting each of said work center X-factors by a percentage that a corresponding one of said work center raw processing times represents of said manufacturing line raw processing time to produce X-factor contributions for each of said work centers; and
    modifying at least one work center of said work centers having an X-factor contribution higher than others of said X-factor contributions to reduce said X-factor contribution of said at least one work center.

2. The process in claim 1, wherein said determining work center raw processing times comprises measuring a time for a work center to perform work on a workpiece, and
    said determining work center cycle times comprises measuring a time from when said workpiece arrives at said work center until said workpiece leaves said work center.

3. The process in claim 1, wherein said modifying at least one work center further comprises determining whether said at least one work center is being utilized at approximately a maximum effective capacity.

4. The process in claim 1, wherein said modifying at least one work center comprises increasing effective capacity of said at least one work center.

5. The process in claim 1, wherein said modifying at least one work center comprises optimizing batch-size for said at least one work center utilizing:

$$N = 1 + \left((X - 1) * M * \frac{RPT}{12}\right)$$

wherein N comprises said batch-size, X comprises a work center X-factor of said at least one work center, M comprises an average number of workpieces processed per day by said work center, and RPT comprises a work center raw processing time of said at least one work center.

6. The process in claim 1, wherein said work center comprises a group of tools and said determining work center raw processing times, summing said work center raw processing times, determining work center cycle times, dividing said work center cycle times by respective ones of said work center raw processing times, weighting each of said work center X-factors and modifying at least one work center are repeated for each tool within said work center to determine which tool of said tools has an X-factor contribution higher than others of X-factor contributions of said tools.

7. A process for optimizing a manufacturing line comprising:
    determining work center raw processing times of a plurality of work centers in said manufacturing line;
    summing said work center raw processing times to produce a manufacturing line raw processing time;
    determining work center cycle times of said work centers;
    dividing said work center cycle times by respective ones of said work center raw processing times to produce work center X-factors; and
    weighting each of said work center X-factors by a percentage that each of said work centers represents of a raw processing time of said manufacturing line to produce work center X-factor contributions for each of said work centers.

8. The process in claim 7, wherein said determining work center raw processing times comprises measuring a time for a work center to perform work on a workpiece, and said determining work center cycle times comprises measuring a time from when said workpiece arrives at said work center until said workpiece leaves said work center.

9. The process in claim 7, wherein said work center comprises a group of tools and said determining and weighting are repeated for each tool within said work center to determine which tool of said tools has an X-factor contribution higher than others of X-factor contributions of said tools.

10. A computer system for performing a process for optimizing a manufacturing line, said computer system comprising:

a unit for determining work center raw processing times of a plurality of work centers in said manufacturing line;

a unit for summing said work center raw processing times to produce a manufacturing line raw processing time;

a unit for determining work center cycle times of said work centers;

a unit for dividing said work center cycle times by respective ones of said work center raw processing times to produce work center X-factors;

a unit for weighting each of said work center X-factors by a percentage that each of said work centers represents of a raw processing time of said manufacturing line to produce work center X-factor contributions for each of said work centers; and a unit for modifying at least one work center of said work centers having an X-factor contribution higher than others of said X-factor contributions to reduce said X-factor contribution of said at least one work center.

11. The computer system in claim 10, wherein said unit for determining work center raw processing times comprises a unit for measuring a time for a work center to perform work on a workpiece, and said unit for determining work center cycle times comprises a unit for measuring a time from when said workpiece arrives at said work center until said workpiece leaves said work center.

12. The computer system in claim 10, wherein said unit for modifying at least one work center further comprises a unit for determining whether said at least one work center is being utilized at approximately a maximum effective capacity.

13. The computer system in claim 10, wherein said unit for modifying at least one work center comprises a unit for increasing effective capacity of said at least one work center.

14. The computer system in claim 10, wherein said unit for modifying at least one work center comprises a unit for optimizing batch-size for said at least one work center utilizing:

$$N = 1 + \left((X - 1) * M * \frac{RPT}{12}\right)$$

wherein N comprises said batch-size, X comprises a work center X-factor of said at least one work center, M comprises an average number of workpieces processed per day by said work center, and RPT comprises a work center raw processing time of said at least one work center.

15. The computer system in claim 10, wherein said work center comprises a group of tools and said unit for determining and said unit for weighting are applied to each tool within said work center to determine which tool of said tools has an X-factor contribution higher than others of X-factor contributions of said tools.

16. A computer program product comprising a program storage device readable by a computer system tangibly embodying a program of instructions executed by said computer system to perform a process for optimizing a manufacturing line, said process comprising:

determining work center raw processing times of a plurality of work centers in said manufacturing line;

summing said work center raw processing times to produce a manufacturing line raw processing time;

determining work center cycle times of said work centers;

dividing said work center cycle times by respective ones of said work center raw processing times to produce work center X-factors;

weighting each of said work center X-factors by a percentage that each of said work centers represents of a raw processing time of said manufacturing line to produce work center X-factor contributions for each of said work centers; and modifying at least one work center of said work centers having an X-factor contribution higher than others of said X-factor contributions to reduce said X-factor contribution of said at least one work center.

17. The computer program product in claim 16, wherein said determining work center raw processing times comprises measuring a time for a work center to perform work on a workpiece, and said determining work center cycle times comprises measuring a time from when said workpiece arrives at said work center until said workpiece leaves said work center.

18. The computer program product in claim 16, wherein said modifying at least one work center further comprises determining whether said at least one work center is being utilized at approximately a maximum effective capacity.

19. The computer program product in claim 16, wherein said modifying at least one work center comprises increasing effective capacity of said at least one work center.

20. The computer program product in claim 16, wherein said modifying at least one work center comprises optimizing batch-size for said at least one work center utilizing:

$$N = 1 + \left((X - 1) * M * \frac{RPT}{12}\right)$$

wherein N comprises said batch-size, X comprises a work center X-factor of said at least one work center, M comprises an average number of workpieces processed per day by said work center, and RPT comprises a work center raw processing time of said at least one work center.

21. The computer program product in claim 16, wherein said work center comprises a group of tools and said determining and weighting repeated for each tool within said work center to determine which tool of said tools has an X-factor contribution higher than others of X-factor contributions of said tools.

* * * * *

UNITED STATES PATENT AND TRADEMARK OFFICE
CERTIFICATE OF CORRECTION

PATENT NO. : 6,259,959 B1
DATED : July 10, 2001
INVENTOR(S) : Martin

It is certified that error appears in the above-identified patent and that said Letters Patent is hereby corrected as shown below:

Column 2,
Line 32, after "the" insert -- steps of --.

Column 5,
Line 21, after "(RPT", insert -- ) --;
Line 40 (equation 6), first occurrence, delete "+" and insert -- = --.

Signed and Sealed this

Ninth Day of April, 2002

Attest:

Attesting Officer

JAMES E. ROGAN
Director of the United States Patent and Trademark Office